(12) United States Patent
Dubois et al.

(10) Patent No.: US 10,205,192 B2
(45) Date of Patent: Feb. 12, 2019

(54) NONAQUEOUS ELECTROLYTE COMPOSITIONS COMPRISING CYCLIC SULFATES AND LITHIUM BORATES

(71) Applicant: Solvay SA, Brussels (BE)

(72) Inventors: Charles J. Dubois, Orange, TX (US); Kostantinos Kourtakis, Media, PA (US); Jun J. Liu, Wilmington, DE (US); Mark Gerrit Roelofs, Earleville, MD (US)

(73) Assignee: Solvay SA, Brussels (BE)

( * ) Notice: Subject to any disclaimer, the term of this patent is extended or adjusted under 35 U.S.C. 154(b) by 0 days.

(21) Appl. No.: 15/311,312

(22) PCT Filed: May 14, 2015

(86) PCT No.: PCT/US2015/030807
§ 371 (c)(1),
(2) Date: Nov. 15, 2016

(87) PCT Pub. No.: WO2015/179210
PCT Pub. Date: Nov. 26, 2015

(65) Prior Publication Data
US 2017/0117586 A1   Apr. 27, 2017

Related U.S. Application Data

(60) Provisional application No. 62/029,009, filed on Jul. 25, 2014, provisional application No. 62/020,087, filed on Jul. 2, 2014, provisional application No. 62/002,349, filed on May 23, 2014.

(51) Int. Cl.
| | |
|---|---|
| H01M 10/0567 | (2010.01) |
| H01M 10/0568 | (2010.01) |
| H01M 10/0569 | (2010.01) |
| H01M 4/1315 | (2010.01) |
| H01M 4/505 | (2010.01) |
| H01M 4/525 | (2010.01) |
| H01M 10/0525 | (2010.01) |
| H01M 4/485 | (2010.01) |
| H01M 4/583 | (2010.01) |

(52) U.S. Cl.
CPC ..... *H01M 10/0569* (2013.01); *H01M 4/1315* (2013.01); *H01M 4/485* (2013.01); *H01M 4/505* (2013.01); *H01M 4/525* (2013.01); *H01M 4/583* (2013.01); *H01M 10/0525* (2013.01); *H01M 10/0567* (2013.01); *H01M 10/0568* (2013.01); *H01M 2220/20* (2013.01); *H01M 2220/30* (2013.01); *H01M 2300/0034* (2013.01); *H01M 2300/0037* (2013.01)

(58) Field of Classification Search
CPC .... H01M 4/1315; H01M 4/485; H01M 4/505; H01M 4/525; H01M 4/583; H01M 10/0525; H01M 10/0567; H01M 10/0568; H01M 10/0569; H01M 2300/0034; H01M 2300/0037; H01M 2220/20; H01M 2220/30
See application file for complete search history.

(56) References Cited

U.S. PATENT DOCUMENTS

| | | | |
|---|---|---|---|
| 5,738,957 A | 4/1998 | Amine et al. | |
| 7,303,840 B2 | 12/2007 | Thackeray et al. | |
| 7,468,223 B2 | 12/2008 | Thackeray et al. | |
| 8,518,525 B2 | 8/2013 | Dennes et al. | |
| 2005/0266313 A1* | 12/2005 | Kitao | H01M 4/364 429/231.1 |
| 2006/0051671 A1 | 3/2006 | Thackeray et al. | |

(Continued)

FOREIGN PATENT DOCUMENTS

| | | |
|---|---|---|
| CN | 102983358 A | 3/2013 |
| JP | 2005-293920 A | 10/2005 |

(Continued)

OTHER PUBLICATIONS

Zhang, et al., "A review onelectrolyte additives for lithium-ion batteries"; Journal of Power Sources, Elsevier AA, Ch; vol. 162, No. 2, Nov. 22, 2006; XP027938606, ISSN: 0378-7753; pp. 1379-1394.

(Continued)

*Primary Examiner* — Anca Eoff
(74) *Attorney, Agent, or Firm* — Osha Liang LLP

(57) ABSTRACT

Described are electrolyte compositions containing a non-fluorinated carbonate, a fluorinated solvent, a cyclic sulfate, at least one lithium borate salt selected from lithium bis (oxalato)borate, lithium difluoro(oxalato)borate, lithium tetrafluoroborate, or mixtures thereof, and at least one electrolyte salt. The cyclic sulfate can be represented by the formula:

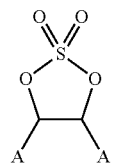

wherein each A is independently a hydrogen or an optionally fluorinated vinyl, allyl, acetylenic, propargyl, or $C_1$-$C_3$ alkyl group. The electrolyte composition may further comprise a fluorinated cyclic carbonate. The electrolyte compositions are useful in electrochemical cells, such as lithium ion batteries.

17 Claims, No Drawings

(56) References Cited

U.S. PATENT DOCUMENTS

| | | | | |
|---|---|---|---|---|
| 2007/0224504 | A1* | 9/2007 | Kita | H01M 4/131 |
| | | | | 429/231.1 |
| 2010/0119881 | A1* | 5/2010 | Patel | H01M 2/34 |
| | | | | 429/7 |
| 2013/0177819 | A1* | 7/2013 | Han | H01M 10/052 |
| | | | | 429/303 |
| 2014/0017572 | A1 | 1/2014 | Uehara et al. | |
| 2014/0134501 | A1* | 5/2014 | Li | H01M 10/052 |
| | | | | 429/339 |
| 2015/0079463 | A1* | 3/2015 | Yamamoto | H01M 4/505 |
| | | | | 429/188 |
| 2017/0084951 | A1* | 3/2017 | Dubois | H01M 4/485 |

FOREIGN PATENT DOCUMENTS

| | | |
|---|---|---|
| JP | 2006-140115 A | 6/2006 |
| KR | 2013-0134237 A | 12/2013 |
| WO | WO 2013/033595 * | 3/2013 |
| WO | WO 2013/161445 * | 10/2013 |

OTHER PUBLICATIONS

Kang, Xu; "Nonaqueous Liquid Electrolytes for Lithium-Based Rechargeable Batteries"; Chemical Reviews, vol. 104, vol. 10, Oct. 1 2004; XP055139331, ISSN: 0009-2665, DOI: 10.1021/cr030203g; pp. 4303-4418.

Liu, Jun, et al., "Understanding the Improved Electrochemical Performances of Fe-Substituted 5 V Spinel Cathode $LiMn_{1.5}Ni0.5O4$"; J. Phys. Chem., American Chemical Society; C 2009, 113; pp. 15073-15079.

Yoon, Sukeun, et al., "Sb-MOx-C (M=Al, Ti, or Mo) Nanocomposite Anodes for Lithium-Ion Batteries"; Chemistry of Materials, American Chemical Society; vol. 21, 2009; pp. 3898-3904.

* cited by examiner

NONAQUEOUS ELECTROLYTE COMPOSITIONS COMPRISING CYCLIC SULFATES AND LITHIUM BORATES

CROSS REFERENCE TO RELATED APPLICATIONS

This application claims the benefit of priority of United States Provisional Application Nos. 62/002,349, filed on May 23, 2014; 62/020,087 filed on Jul. 2, 2014; and 62/029,009 filed Jul. 25, 2014; all of which are herein incorporated by reference in their entirety.

FIELD OF DISCLOSURE

The disclosure herein relates to electrolyte compositions containing a non-fluorinated carbonate, a fluorinated solvent, a cyclic sulfate, at least one lithium borate salt selected from lithium bis(oxalato)borate, lithium difluoro(oxalato)borate, lithium tetrafluoroborate, or mixtures thereof, and at least one electrolyte salt. The electrolyte composition may further comprise a fluorinated cyclic carbonate. The electrolyte compositions are useful in electrochemical cells, such as lithium ion batteries.

BACKGROUND

Carbonate compounds are currently used as electrolyte solvents for non-aqueous batteries containing electrodes made from alkali metals, alkaline earth metals, or compounds comprising these metals, for example lithium ion batteries. Current lithium ion battery electrolyte solvents typically contain one or more linear carbonates, such as ethyl methyl carbonate, dimethyl carbonate, or diethylcarbonate; and a cyclic carbonate, such as ethylene carbonate. However, at cathode potentials above 4.35 V these electrolyte solvents can decompose, which can result in a loss of battery performance.

Various approaches have been investigated to overcome the limitations of commonly used non-aqueous electrolyte solvents. Although these electrolyte solvents can be used in lithium ion batteries having high potential cathodes, specifically at voltages greater than about 4.35 V, such as $LiCoO_2$ or $LiNi_xMn_yCo_zO_2$ where x+y+z is about 1, charged to cathode potentials higher than the standard 4.1 to 4.25 V range in order to access higher capacity, cycling performance can be limited, particularly at high temperatures.

A need remains for electrolyte solvents, and compositions thereof, that will have improved performance at high temperature when used in a lithium ion battery, particularly such a battery that operates with a high potential cathode (i.e. up to about 5 V).

SUMMARY

In one embodiment, there is provided herein an electrolyte composition comprising:
a) a non-fluorinated carbonate;
b) a fluorinated solvent;
c) a cyclic sulfate represented by the formula:

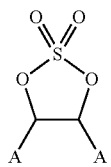

wherein each A is independently a hydrogen or an optionally fluorinated vinyl, allyl, acetylenic, or propargyl group;
d) at least one lithium borate salt selected from lithium bis(oxalato)borate, lithium difluorooxalatoborate, lithium tetrafluoroborate or mixtures thereof; and
e) at least one electrolyte salt.

In one embodiment, the non-fluorinated carbonate is ethylene carbonate, ethyl methyl carbonate, dimethyl carbonate, diethyl carbonate, propylene carbonate, or mixtures thereof In one embodiment, the fluorinated solvent is at least one fluorinated solvent selected from fluorinated acyclic carboxylic acid esters, fluorinated acyclic carbonates, and fluorinated acyclic ethers.

In one embodiment, the cyclic sulfate comprises ethylene sulfate.

In one embodiment, the lithium borate salt is lithium bis(oxalato)borate.

In one embodiment, the electrolyte composition further comprises a fluorinated cyclic carbonate.

In another embodiment there is a provided a method to prepare an electrolyte composition comprising combining a), b), c), d), and e), as defined above, to form an electrolyte composition.

In another embodiment, there is provided herein an electrochemical cell comprising an electrolyte composition disclosed herein.

In a further embodiment, the electrochemical cell is a lithium ion battery.

DETAILED DESCRIPTION

As used above and throughout the disclosure, the following terms, unless otherwise indicated, shall be defined as follows:

The term "electrolyte composition" as used herein, refers to a chemical composition suitable for use as an electrolyte in an electrochemical cell.

The term "electrolyte salt" as used herein, refers to an ionic salt that is at least partially soluble in the solvent of the electrolyte composition and that at least partially dissociates into ions in the solvent of the electrolyte composition to form a conductive electrolyte composition.

The term "anode" refers to the electrode of an electrochemical cell, at which oxidation occurs. In a galvanic cell, such as a battery, the anode is the negatively charged electrode. In a secondary (i.e. rechargeable) battery, the anode is the electrode at which oxidation occurs during discharge and reduction occurs during charging.

The term "cathode" refers to the electrode of an electrochemical cell, at which reduction occurs. In a galvanic cell, such as a battery, the cathode is the positively charged electrode. In a secondary (i.e. rechargeable) battery, the cathode is the electrode at which reduction occurs during discharge and oxidation occurs during charging.

The term "lithium ion battery" refers to a type of rechargeable battery in which lithium ions move from the anode to the cathode during discharge and from the cathode to the anode during charge.

Equilibrium potential between lithium and lithium ion is the potential of a reference electrode using lithium metal in contact with the non-aqueous electrolyte containing lithium salt at a concentration sufficient to give about 1 mole/liter of lithium ion concentration, and subjected to sufficiently small currents so that the potential of the reference electrode is not significantly altered from its equilibrium value ($Li/Li^+$). The potential of such a $Li/Li^+$ reference electrode is assigned here the value of 0.0V. Potential of an anode or cathode means the potential difference between the anode or cathode and that of a Li/Li⁺ reference electrode. Herein voltage means the voltage difference between the cathode and the anode of a cell, neither electrode of which may be operating at a potential of 0.0V.

Disclosed herein are electrolyte compositions comprising:
a) a non-fluorinated carbonate;
b) a fluorinated solvent;
c) a cyclic sulfate represented by the formula:

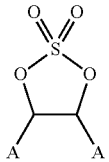

wherein each A is independently a hydrogen or an optionally fluorinated vinyl, allyl, acetylenic, propargyl, or $C_1$-$C_3$ alkyl group;
d) at least one lithium borate salt selected from lithium bis(oxalato)borate, lithium difluoro(oxalato)borate, lithium tetrafluoroborate, or mixtures thereof; and
e) at least one electrolyte salt.

The term "carbonate" as used herein refers specifically to an organic carbonate, wherein the organic carbonate is a dialkyl diester derivative of carbonic acid, the organic carbonate having a general formula: R'OCOOR", wherein R' and R" are each independently selected from alkyl groups having at least one carbon atom, wherein the alkyl substituents can be the same or different, can be saturated or unsaturated, substituted or unsubstituted, can form a cyclic structure via interconnected atoms, or include a cyclic structure as a substituent of either or both of the alkyl groups.

One or more non-fluorinated carbonates may be used in the electrolyte composition. Suitable non-fluorinated carbonates include ethylene carbonate, ethyl methyl carbonate, dimethyl carbonate, diethyl carbonate, propylene carbonate, vinylene carbonate, di-tert-butyl carbonate, dipropyl carbonate, methyl propyl carbonate, ethyl propyl vinylene carbonate, methyl butyl carbonate, ethyl butyl carbonate, propyl butyl carbonate, dibutyl carbonate, vinylethylene carbonate, dimethylvinylene carbonate, or mixtures thereof. In one embodiment, the non-fluorinated carbonate is ethylene carbonate, ethyl methyl carbonate, dimethyl carbonate, diethyl carbonate, propylene carbonate, or mixtures thereof. In some embodiments, the non-fluorinated carbonate is ethylene carbonate.

In the electrolyte compositions disclosed herein, the non-fluorinated carbonate or mixtures thereof can be used in various amounts depending on the desired properties of the electrolyte composition. In one embodiment, the non-fluorinated carbonate(s) in combination comprises about 0.5% to about 95% by weight of the electrolyte composition, or about 5% to about 95%, or about 10% to about 80% by weight of the electrolyte composition, or about, 20% to about 40% by weight of the electrolyte composition, or about 25% to about 35% by weight of the electrolyte composition. In another embodiment, the non-fluorinated carbonate(s) comprises about 0.5% to about 10% by weight of the electrolyte composition, or about 1% to about 10%, or about 5% to about 10%.

One or more fluorinated solvents may be used in the electrolyte composition. The fluorinated solvent is at least one fluorinated solvent selected from fluorinated acyclic carboxylic acid esters, fluorinated acyclic carbonates, and fluorinated acyclic ethers. More specifically, the fluorinated solvent is:
a) a fluorinated acyclic carboxylic acid ester represented by the formula:

$R^1$—COO—$R^2$, b) a fluorinated acyclic carbonate represented by the formula:

$R^3$—OCOO—$R^4$, c) a fluorinated acyclic ether represented by the formula:

$R^5$—O—$R^6$, or a mixture thereof;
wherein $R^1$, $R^2$, $R^3$, $R^4$, $R^5$, and $R^6$ each independently represent an alkyl group; the sum of carbon atoms in any of $R^1$ and $R^2$, $R^3$ and $R^4$, and $R^5$ and $R^6$ is 2 to 7; at least two hydrogens in $R^1$ and/or $R^2$, $R^3$ and/or $R^4$, and $R^5$ and/or $R^6$ are replaced by fluorines; and neither $R^1$, $R^2$, $R^3$, $R^4$, $R^5$, nor $R^6$ contains a —$CH_2F$ or —CHF— group.

Examples of suitable fluorinated acyclic carboxylic acid esters include without limitation $CH_3$—COO—$CH_2CF_2H$ (2,2-difluoroethyl acetate, CAS No. 1550-44-3), $CH_3$—COO—$CH_2CF_3$ (2,2,2-trifluoroethyl acetate, CAS No. 406-95-1), $CH_3CH_2$—COO—$CH_2CF_2H$ (2,2-difluoroethyl propionate, CAS No. 1133129-90-4), $CH_3$—COO—$CH_2CH_2CF_2H$ (3,3-difluoropropyl acetate), $CH_3CH_2$—COO—$CH_2CH_2CF_2H$ (3,3-difluoropropyl propionate), $F_2CHCH_2$—COO—$CH_3$, $F_2CHCH_2$—COO—$CH_2CH_3$, and $F_2CHCH_2CH_2$—COO—$CH_2CH_3$ (ethyl 4,4-difluorobutanoate, CAS No. 1240725-43-2). In one embodiment, the fluorinated acyclic carboxylic acid ester is 2,2-difluoroethyl acetate ($CH_3$—COO—$CH_2CF_2H$).

In one embodiment, the number of carbon atoms in $R^1$ in the formula above is 1, 3, 4, or 5.

In another embodiment, the number of carbon atoms in $R^1$ in the formula above is 1.

In another embodiment, $R^1$ and $R^3$ in the formula above do not contain fluorine, and $R^2$ and $R^4$ contain fluorine.

Suitable fluorinated acyclic carbonates are represented by the formula $R^3$—OCOO—$R^4$, where $R^3$ and $R^4$ independently represent a linear or branched alkyl group, the sum of carbon atoms in $R^3$ and $R^4$ is 2 to 7, at least two hydrogens in $R^3$ and/or $R^4$ are replaced by fluorines (that is, at least two hydrogens in $R^3$ are replaced by fluorines, or at least two hydrogens in $R^4$ are replaced by fluorines, or at least two hydrogens in $R^3$ and at least two hydrogens in $R^4$ are replaced by fluorines), and neither $R^3$ nor $R^4$ contains a $FCH_2$ or FCH group. Examples of suitable fluorinated acyclic carbonates include without limitation $CH_3$—OC(O)O—$CH_2CF_2H$ (methyl 2,2-difluoroethyl carbonate, CAS No. 916678-13-2), $CH_3$—OC(O)O—$CH_2CF_3$ (methyl 2,2,2-trifluoroethyl carbonate, CAS No. 156783-95-8), $CH_3$—OC(O)O—$CH_2CF_2CF_2H$ (methyl 2,2,3,3-tetrafluoropropyl carbonate, CAS No. 156783-98-1), $HCF_2CH_2$—OCOO—$CH_2CH_3$ (ethyl 2,2-difluoroethyl carbonate, CAS No. 916678-14-3), and $CF_3CH_2$—OCOO—$CH_2CH_3$ (ethyl 2,2,2-trifluoroethyl carbonate, CAS No. 156783-96-9).

Suitable fluorinated acyclic ethers are represented by the formula: $R^5$—O—$R^6$, where $R^5$ and $R^6$ independently represent a linear or branched alkyl group, the sum of carbon atoms in $R^5$ and $R^6$ is 2 to 7, at least two hydrogens in $R^5$ and/or $R^6$ (that is, at least two hydrogens in $R^5$ are replaced by fluorines, or at least two hydrogens in $R^6$ are replaced by fluorines, or at least hydrogens in $R^5$ are replaced by fluorines and at least two hydrogens in $R^6$ are replaced by fluorines), are replaced by fluorines and neither $R^5$ nor $R^6$ contains a $FCH_2$ or FCH group. Examples of suitable fluorinated acyclic ethers include without limitation $HCF_2CF_2CH_2$—O—$CF_2CF_2H$ (CAS No. 16627-68-2) and $HCF_2CH_2$—O—$CF_2CF_2H$ (CAS No. 50807-77-7).

A mixture of two or more of these fluorinated acyclic carboxylic acid ester, fluorinated acyclic carbonate, and/or fluorinated acyclic ether solvents may also be used. A non-limiting example is a mixture of 2,2-difluoroethyl acetate and 2,2-difluoroethyl propionate or a mixture of 2,2-difluoroethyl acetate and 2,2-difluoroethyl methyl carbonate.

In the electrolyte compositions disclosed herein, the fluorinated solvent or mixtures thereof can be used in various amounts depending on the desired properties of the electrolyte composition. In one embodiment, the fluorinated solvent comprises about 5% to about 95% by weight of the electrolyte composition. In another embodiment, the fluorinated solvent comprises about 10% to about 80% by weight of the electrolyte composition. In another embodiment, the fluorinated solvent comprises about 30% to about 70% by weight of the electrolyte composition. In another embodiment, the fluorinated solvent comprises about 50% to about 70% by weight of the electrolyte composition. In another embodiment, the fluorinated solvent comprises about 45% to about 65% by weight of the electrolyte composition. In another embodiment, the fluorinated solvent comprises about 6% to about 30% by weight of the electrolyte composition.

Fluorinated acyclic carboxylic acid esters, fluorinated acyclic carbonates, and fluorinated acyclic ethers suitable for use herein may be prepared using known methods. For example, acetyl chloride may be reacted with 2,2-difluoroethanol (with or without a basic catalyst) to form 2,2-difluoroethyl acetate. Additionally, 2,2-difluoroethyl acetate and 2,2-difluoroethyl propionate may be prepared using the method described by Wiesenhofer et al. (WO 2009/040367 A1, Example 5). Alternatively, 2,2-difluoroethyl acetate can be prepared using the method described in the Examples herein below. Other fluorinated acyclic carboxylic acid esters may be prepared using the same method using different starting carboxylate salts. Similarly, methyl chloroformate may be reacted with 2,2-difluoroethanol to form methyl 2,2-difluoroethyl carbonate. Synthesis of $HCF_2CF_2CH_2$—O—$CF_2CF_2H$ can be done by reacting 2,2,3,3-tetrafluoropropanol with tetrafluoroethylene in the presence of base (e.g., NaH, etc.). Similarly, reaction of 2,2-difluoroethanol with tetrafluoroethylene yields $HCF_2CH_2$—O—$CF_2CF_2H$. Alternatively, some of these fluorinated solvents may be purchased from companies such as Matrix Scientific (Columbia S.C.). For best results, it is desirable to purify the fluorinated acyclic carboxylic esters and fluorinated acyclic carbonates to a purity level of at least about 99.9%, more particularly at least about 99.99%. These fluorinated solvents may be purified using distillation methods such as vacuum distillation or spinning band distillation.

Optionally, the electrolyte composition may further comprise a fluorinated cyclic carbonate. Suitable fluorinated cyclic carbonates can include one or more of fluoroethylene carbonate, difluoroethylene carbonate isomers, trifluoroethylene carbonate, tetrafluoroethylene carbonate, or mixtures thereof. In one embodiment the fluorinated cyclic carbonate is fluoroethylene carbonate, which is also known as 4-fluoro-1,3-dioxolan-2-one. In one embodiment, the organic carbonate comprises 4,5-difluoro-1,3-dioxolan-2-one; 4,5-difluoro-4-methyl-1,3-dioxolan-2-one; 4,5-difluoro-4,5-dimethyl-1,3-dioxolan-2-one; 4,4-difluoro-1,3-dioxolan-2-one; 4,4,5-trifluoro-1,3-dioxolan-2-one; or mixtures thereof.

In one embodiment, the electrolyte composition optionally comprises about 0.1 weight percent to about 60 weight percent of a fluorinated cyclic carbonate. In other embodiments, the electrolyte composition may comprise about 0.5 weight percent to about 60 weight percent, or about 0.5 weight percent to about 55 weight percent, or about 0.5 weight percent to about 50 weight percent, or about 0.5 weight percent to about 45 weight percent, or about 0.5 weight percent to about 40 weight percent, or about 0.5 weight percent to about 35 weight percent, or about 0.5 weight percent to about 30 weight percent, or about 0.5 weight percent to about 25 weight percent, or about 0.5 weight percent to about 20 weight percent, or about 0.5 weight percent to about 15 weight percent, or about 0.5 weight percent to about 10 weight percent, or about 0.5 weight percent to about 5 weight percent, or about 0.5 weight percent to about 3 weight percent, of the fluorinated cyclic carbonate.

The electrolyte compositions disclosed herein also comprise a cyclic sulfate represented by the formula:

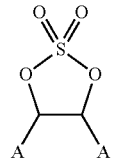

wherein each A is independently a hydrogen or an optionally fluorinated vinyl, allyl, acetylenic, propargyl, or $C_1$-$C_3$ alkyl group. The vinyl ($H_2C$=CH—), allyl ($H_2C$=CH—$CH_2$—), acetylenic (HC≡C—), propargyl (HC≡C—$CH_2$—) or $C_1$-$C_3$ alkyl groups may each be unsubstituted or partially or totally fluorinated. Mixtures of two or more cyclic sulfates may also be used. Suitable cyclic sulfates include ethylene sulfate (1,3,2-dioxathiolane, 2,2-dioxide), 1,3,2-dioxathiolane, 4-ethynyl-, 2,2-dioxide, 1,3,2-dioxathiolane, 4-ethenyl-, 2,2-dioxide, 1,3,2-dioxathiolane, diethenyl-, 2,2-dioxide, 1,3,2-dioxathiolane, 4-methyl-, 2,2-dioxide, and 1,3,2-dioxathiolane, 4,5-dimethyl-, 2,2-dioxide. In one embodiment, the cyclic sulfate is ethylene sulfate. In one embodiment the cyclic sulfate is present at about 0.1 weight percent to about 12 weight percent of the total electrolyte composition, or about 0.5 weight percent to less than about 10 weight percent, about 0.5 weight percent to less than about 5 weight percent, or about 0.5 weight percent to about 3 weight percent, or about 0.5 weight percent to about 2 weight percent, or about 2 weight percent to about 3 weight percent. In one embodiment the cyclic sulfate is present at about 1 weight percent to about 3 weight percent or about 1.5 weight percent to about 2.5 weight percent, or about 2 weight percent of the total electrolyte composition.

The electrolyte compositions disclosed herein comprise at least one lithium borate salt, such as lithium bis(oxalato)borate, lithium difluoro(oxalato)borate, lithium tetrafluoroborate, other lithium borate salts, or mixtures thereof. In one embodiment, the electrolyte compositions comprise at least one lithium borate salt selected from lithium bis(oxalato)borate, lithium difluoro(oxalato)borate, lithium tetrafluoroborate, or mixtures thereof. In some embodiments, the electrolyte composition comprises lithium bis(oxalato) borate. In other embodiments, the electrolyte composition comprises lithium difluoro(oxalato)borate. In some embodiments, the electrolyte composition comprises lithium tetrafluoroborate. The lithium borate salt may be present in the electrolyte composition in the range of from 0.1 to about 10 percent by weight, based on the total weight of the electrolyte composition, for example in the range of from 0.1 to about 5.0 percent by weight, or from 0.3 to about 4.0 percent by weight, or from 0.5 to 2.0 percent by weight.

In one embodiment, the electrolyte composition comprises ethylene carbonate, 2,2-difluoroethyl acetate, ethylene sulfate, and lithium bis(oxalato)borate. In another embodiment, the electrolyte composition comprises about 0.1 weight percent to about 12 weight percent of ethylene sulfate and about 0.1 weight percent to about 3 weight percent of lithium bis(oxalato)borate In another embodiment, the electrolyte composition comprises ethylene carbonate, 2,2-difluoroethyl acetate, ethylene sulfate, lithium bis(oxalato)borate, and further comprises fluoroethylene carbonate. In another embodiment, the electrolyte composition comprises about 0.1 weight percent to about 12 weight percent of ethylene sulfate, about 0.1 weight percent to about 3 weight percent of lithium bis(oxalato)borate, and further comprises about 0.5 weight percent to about 3 weight percent of a fluorinated cyclic carbonate.

The electrolyte compositions disclosed herein also contain at least one electrolyte salt. Suitable electrolyte salts include without limitation
  lithium hexafluorophosphate ($LiPF_6$),
  lithium tris(pentafluoroethyl)trifluorophosphate ($LiPF_3(C_2F_5)_3$),
  lithium bis(trifluoromethanesulfonyl)imide,
  lithium bis(perfluoroethanesulfonyl)imide,
  lithium (fluorosulfonyl) (nonafluorobutanesulfonyl)imide,
  lithium bis(fluorosulfonyl)imide,
  lithium tetrafluoroborate,
  lithium perchlorate,
  lithium hexafluoroarsenate,
  lithium trifluoromethanesulfonate,
  lithium tris(trifluoromethanesulfonyl)methide,
  lithium bis(oxalato)borate,
  lithium difluoro(oxalato)borate,
  $Li_2B_{12}F_{12-x}H_x$ where x is equal to 0 to 8, and
  mixtures of lithium fluoride and anion receptors such as $B(OC_6F_6)_3$.

Mixtures of two or more of these or comparable electrolyte salts may also be used. In one embodiment, the electrolyte salt is lithium hexafluorophosphate. The electrolyte salt can be present in the electrolyte composition in an amount of about 0.2 to about 2.0 M, more particularly about 0.3 to about 1.5 M, and more particularly about 0.5 to about 1.2 M.

Optionally, the electrolyte compositions disclosed herein can further comprise additives that are known to those of ordinary skill in the art to be useful in conventional electrolyte compositions, particularly for use in lithium ion batteries. For example, electrolyte compositions disclosed herein can also include gas-reduction additives which are useful for reducing the amount of gas generated during charging and discharging of lithium ion batteries. Gas-reduction additives can be used in any effective amount, but can be included to comprise from about 0.05 weight % to about 10 weight %, alternatively from about 0.05 weight % to about 5 weight % of the electrolyte composition, or alternatively from about 0.5 weight % to about 2 weight % of the electrolyte composition.

Suitable gas-reduction additives that are known conventionally include, for example: halobenzenes such as fluorobenzene, chlorobenzene, bromobenzene, iodobenzene, or haloalkylbenzenes; 1,3-propane sultone; succinic anhydride; ethynyl sulfonyl benzene; 2-sulfobenzoic acid cyclic anhydride; divinyl sulfone; triphenylphosphate (TPP); diphenyl monobutyl phosphate (DMP); γ-butyrolactone; 2,3-dichloro-1,4-naphthoquinone; 1,2-naphthoquinone; 2,3-dibromo-1,4-naphthoquinone; 3-bromo-I,2-naphthoquinone; 2-acetylfuran; 2-acetyl-5-methylfuran; 2-methyl imidazole1-(phenylsulfonyl)pyrrole; 2,3-benzofuran; fluoro-cyclotriphosphazenes such as 2,4,6-trifluoro-2-phenoxy-4,6-dipropoxy-cyclotriphosphazene and 2,4,6-trifluoro-2-(3-(trifluoromethyl)phenoxy)-6-ethoxy-cyclotriphosphazene; benzotriazole; perfluoroethylene carbonate; anisole; diethylphosphonate; fluoroalkyl-substituted dioxolanes such as 2-trifluoromethyldioxolane and 2,2-bistrifluoromethyl-1,3-dioxolane; trimethylene borate; dihydro-3-hydroxy-4,5,5-trimethyl-2(3H)-furanone; dihydro-2-methoxy-5,5-dimethyl-3(2H)-furanone; dihydro-5,5-dimethyl-2,3-furandione; propene sultone; diglycolic acid anhydride; di-2-propynyl oxalate; 4-hydroxy-3-pentenoic acid γ-lactone; $CF_3COOCH_2C(CH_3)(CH_2OCOCF_3)_2$; $CF_3COOCH_2CF_2CF_2CF_2CF_2CH_2OCOCF_3$; α-methylene-γ-butyrolactone; 3-methyl-2(5H)-furanone; 5,6-dihydro-2-pyranone; diethylene glycol, diacetate; triethylene glycol dimethacrylate; triglycol diacetate; 1,2-ethanedisulfonic anhydride; 1,3-propanedisulfonic anhydride; 2,2,7,7-tetraoxide 1,2,7-oxadithiepane; 3-methyl-2,2,5,5-tetraoxide 1,2,5-oxadithiolane; hexamethoxycyclotriphosphazene; 4,5-dimethyl-4,5-difluoro-1,3-dioxolan-2-one; 2-ethoxy-2,4,4,6,6-pentafluoro-2,2,4,4,6,6-hexahydro-1,3,5,2,4,6-triazatriphosphorine; 2,2,4,4,6-pentafluoro-2,2,4,4,6,6-hexahydro-6-methoxy-1,3,5,2,4,6-triazatriphosphorine 4,5-difluoro-1,3-dioxolan-2-one; 1,4-bis(ethenylsulfonyl)-butane; bis(vinylsulfonyl)-methane; 1,3-bis(ethenylsulfonyl)-propane; 1,2-bis(ethenylsulfonyl)-ethane; and 1,1'-[oxybis(methylenesulfonyl)]bis-ethene.

Other suitable additives that can be used are HF scavengers, such as silanes, silazanes (Si—NH—Si), epoxides, amines, aziridines (containing two carbons), salts of carbonic acid such as lithium oxalate, $B_2O_5$, ZnO, and fluorinated inorganic salts.

In another embodiment, there is provided herein an electrochemical cell comprising a housing, an anode and a cathode disposed in the housing and in ionically conductive contact with one another, an electrolyte composition, as described above, providing an ionically conductive pathway between the anode and the cathode, and a porous or microporous separator between the anode and the cathode. The housing may be any suitable container to house the electrochemical cell components. The anode and the cathode may be comprised of any suitable conducting material depending on the type of electrochemical cell. Suitable examples of anode materials include without limitation lithium metal, lithium metal alloys, lithium titanate, aluminum, platinum, palladium, graphite, transition metal oxides, and lithiated tin oxide. Suitable examples of cathode materials include without limitation graphite, aluminum, platinum, palladium, electroactive transition metal oxides comprising lithium or sodium, indium tin oxide, and conducting polymers such as polypyrrole and polyvinylferrocene.

The porous separator serves to prevent short circuiting between the anode and the cathode. The porous separator typically consists of a single-ply or multi-ply sheet of a microporous polymer such as polyethylene, polypropylene, or a combination thereof. The pore size of the porous separator is sufficiently large to permit transport of ions, but small enough to prevent contact of the anode and cathode either directly or from particle penetration or dendrites which can form on the anode and cathode.

In another embodiment, the electrochemical cell is a lithium ion battery. Suitable cathode materials for a lithium ion battery include without limitation electroactive compounds comprising lithium and transition metals, such as $LiCoO_2$, $LiNiO_2$, $LiMn_2O_4$, $LiCo_{0.2}Ni_{0.2}O_2$ or $LiV_3O_8$;

$Li_aCoG_bO_2$ ($0.90 \leq a \leq 1.8$, and $0.001 \leq b \leq 0.1$);

$Li_aNi_bMn_cCo_dR_eO_{2-f}Z_f$ where $0.8 \leq a \leq 1.2$, $0.1 \leq b \leq 0.5$, $0.2 \leq c \leq 0.7$, $0.05 \leq d \leq 0.4$, $0 \leq e \leq 0.2$, b+c+d+e is about 1, and $0 \leq f \leq 0.08$;

$Li_aA_{1-b}R_bD_2$ ($0.90 \leq a \leq 1.8$ and $0 \leq b \leq 0.5$);

$Li_aE_{1-b}R_bO_{2-c}D_c$ ($0.90 \leq a \leq 1.8$, $0 \leq b \leq 0.5$ and $0 \leq c \leq 0.05$);

$Li_aNi_{1-b-c}Co_bR_cO_{2-d}Z_d$ where $0.9 \leq a \leq 1.8$, $0 \leq b \leq 0.4$, $0 \leq c \leq 0.05$, and $0 \leq d \leq 0.05$;

$Li_{1+z}Ni_{1-x-y}Co_xAl_yO_2$ where $0 < x < 0.3$, $0 < y < 0.1$, and $0 < z < 0.06$;

$LiNi_{0.5}Mn_{1.5}O_4$; $LiFePO_4$, $LiMnPO_4$, $LiCoPO_4$, and $LiVPO_4F$.

In the above chemical formulas A is Ni, Co, Mn, or a combination thereof; D is O, F, S, P, or a combination thereof; E is Co, Mn, or a combination thereof; G is Al, Cr, Mn, Fe, Mg, La, Ce, Sr, V, or a combination thereof; R is Al, Ni, Co, Mn, Cr, Fe, Mg, Sr, V, Zr, Ti, a rare earth element, or a combination thereof; Z is F, S, P, or a combination thereof. Suitable cathodes include those disclosed in U.S. Pat. Nos. 5,962,166, 6,680,145, 6,964,828, 7,026,070, 7,078,128, 7,303,840, 7,381,496, 7,468,223, 7,541,114, 7,718,319, 7,981,544, 8,389,160, 8,394,534, and 8,535,832, and the references therein. By "rare earth element" is meant the lanthanide elements from La to Lu, and Y and Sc. In another embodiment the cathode material is an NMC cathode; that is, a LiNiMnCoO cathode; more specifically, cathodes in which the atomic ratio of Ni:Mn:Co is 1:1:1 ($Li_aNi_{1-b-c}Co_bR_cO_{2-d}Z_d$ where $0.98 \leq a \leq 1.05$, $0 \leq d \leq 0.05$, b=0.333, c=0.333, where R comprises Mn), or where the atomic ratio of Ni:Mn:Co is 5:3:2 ($Li_aNi_{1-b-c}Co_bR_cO_{2-d}Z_d$ where $0.98 \leq a \leq 1.05$, $0 \leq d \leq 0.05$, c=0.3, b=0.2, where R comprises Mn).

In another embodiment, the cathode in the lithium ion battery disclosed herein comprises a cathode active material exhibiting greater than 30 mAh/g capacity in the potential range greater than 4.6 V versus a Li/Li+ reference electrode. One example of such a cathode is a stabilized manganese cathode comprising a lithium-containing manganese composite oxide having a spinel structure as cathode active material. The lithium-containing manganese composite oxide in a cathode suitable for use herein comprises oxides of the formula $Li_xNi_yM_zMn_{2-y-z}O_{4-d}$, wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18; and d is 0 to 0.3. In one embodiment in the above formula, y is 0.38 to 0.48, z is 0.03 to 0.12, and d is 0 to 0.1. In one embodiment in the above formula, M is one or more of Li, Cr, Fe, Co and Ga. Stabilized manganese cathodes may also comprise spinel-layered composites which contain a manganese-containing spinel component and a lithium rich layered structure, as described in U.S. Pat. No. 7,303,840.

In another embodiment, the cathode in the lithium battery disclosed herein comprises a composite material represented by the structure of Formula:

$$x(Li_{2-w}A_{1-v}Q_{w+v}O_{3-e}) \cdot (1-x)(Li_yMn_{2-z}M_zO_{4-d})$$

wherein:
x is about 0.005 to about 0.1;
A comprises one or more of Mn or Ti;
Q comprises one or more of Al, Ca, Co, Cr, Cu, Fe, Ga, Mg, Nb, Ni, Ti, V, Zn, Zr or Y;
e is 0 to about 0.3;
v is 0 to about 0.5.
w is 0 to about 0.6;
M comprises one or more of Al, Ca, Co, Cr, Cu, Fe, Ga, Li, Mg, Mn, Nb, Ni, Si, Ti, V, Zn, Zr or Y;
d is 0 to about 0.5;
y is about 0 to about 1; and
z is about 0.3 to about 1; and
wherein the $Li_yMn_{2-z}M_zO_{4-d}$ component has a spinel structure and the $Li_{2-w}Q_{w+v}A_{1-v}O_{3-e}$ component has a layered structure.

In another embodiment, the cathode in the lithium ion battery disclosed herein comprises a cathode active material which is charged to a potential greater than or equal to about 4.1 V, or greater than 4.35 V, or greater than 4.5 V, or greater than 4.6 V versus a Li/Li+ reference electrode. Other examples are layered-layered high-capacity oxygen-release cathodes such as those described in U.S. Pat. No. 7,468,223 charged to upper charging potentials above 4.5 V.

A cathode active material suitable for use herein can be prepared using methods such as the hydroxide precursor method described by Liu et al (*J. Phys. Chem. C* 13:15073-15079, 2009). In that method, hydroxide precursors are precipitated from a solution containing the required amounts of manganese, nickel and other desired metal(s) acetates by the addition of KOH. The resulting precipitate is oven-dried and then fired with the required amount of $LiOH \cdot H_2O$ at about 800 to about 1000° C. in oxygen for 3 to 24 hours. Alternatively, the cathode active material can be prepared using a solid phase reaction process or a sol-gel process as described in U.S. Pat. No. 5,738,957 (Amine).

A cathode, in which the cathode active material is contained, suitable for use herein may be prepared by methods such as mixing an effective amount of the cathode active material (e.g. about 70 wt % to about 97 wt %), a polymer binder, such as polyvinylidene difluoride, and conductive carbon in a suitable solvent, such as N-methylpyrrolidone, to generate a paste, which is then coated onto a current collector such as aluminum foil, and dried to form the cathode.

A lithium ion battery as disclosed herein further contains an anode, which comprises an anode active material that is capable of storing and releasing lithium ions. Examples of suitable anode active materials include without limitation lithium alloys such as lithium-aluminum alloy, lithium-lead alloy, lithium-silicon alloy, lithium-tin alloy and the like; carbon materials such as graphite and mesocarbon microbeads (MCMB); phosphorus-containing materials such as black phosphorus, $MnP_4$ and $CoP_3$; metal oxides such as $SnO_2$, SnO and $TiO_2$; nanocomposites containing antimony or tin, for example nanocomposites containing antimony, oxides of aluminum, titanium, or molybdenum, and carbon, such as those described by Yoon et al (*Chem. Mater.* 21, 3898-3904, 2009); and lithium titanates such as $Li_4Ti_5O_{12}$ and $LiTi_2O_4$. In one embodiment, the anode active material is lithium titanate or graphite. In another embodiment, the anode is graphite.

An anode can be made by a method similar to that described above for a cathode wherein, for example, a binder such as a vinyl fluoride-based copolymer is dissolved or dispersed in an organic solvent or water, which is then mixed with the active, conductive material to obtain a paste. The paste is coated onto a metal foil, preferably aluminum or copper foil, to be used as the current collector. The paste is dried, preferably with heat, so that the active mass is bonded to the current collector. Suitable anode active materials and anodes are available commercially from companies such as Hitachi NEI Inc. (Somerset, N.J.), and Farasis Energy Inc. (Hayward, Calif.).

A lithium ion battery as disclosed herein also contains a porous separator between the anode and cathode. The porous separator serves to prevent short circuiting between the anode and the cathode. The porous separator typically consists of a single-ply or multi-ply sheet of a microporous polymer such as polyethylene, polypropylene, polyamide or polyimide, or a combination thereof. The pore size of the porous separator is sufficiently large to permit transport of ions to provide ionically conductive contact between the anode and cathode, but small enough to prevent contact of the anode and cathode either directly or from particle penetration or dendrites which can from on the anode and cathode. Examples of porous separators suitable for use herein are disclosed in U.S. application Ser. No. 12/963,927 (filed 9 Dec. 2010, U.S. Patent Application Publication No. 2012/0149852, now U.S. Pat. No. 8,518,525).

The housing of the lithium ion battery hereof may be any suitable container to house the lithium ion battery components described above. Such a container may be fabricated in the shape of small or large cylinder, a prismatic case or a pouch.

The lithium ion battery disclosed herein may be used for grid storage or as a power source in various electronically-powered or -assisted devices ("Electronic Device") such as a computer, a camera, a radio or a power tool, various telecommunications devices, or various transportation devices (including a motor vehicle, automobile, truck, bus or airplane).

In another embodiment there is provided a method to prepare an electrolyte composition, the method comprising combining a) a non-fluorinated carbonate; b) a fluorinated solvent; c) a cyclic sulfate; d) at least one lithium borate salt selected from lithium bis(oxalato)borate, lithium difluoro (oxalato)borate, lithium tetrafluoroborate, or mixtures thereof; and e) at least one electrolyte salt; to form an electrolyte composition. The components a), b), c), d), and e) are as defined herein, and can be combined in any suitable order.

EXAMPLES

The concepts disclosed herein will be further described in the following examples, which do not limit the scope of the invention described in the claims.

The meaning of abbreviations used is as follows: "g" means gram(s), "mg" means milligram(s), "µg" means microgram(s), "L" means liter(s), "mL" means milliliter(s), "mol" means mole(s), "mmol" means millimole(s), "M" means molar concentration, "wt %" means percent by weight, "mm" means millimeter(s), "ppm" means parts per million, "h" means hour(s), "min" means minute(s), "A" means amperes, "mA" mean milliampere(s), "mAh/g" mean milliamperes hour(s) per gram, "V" means volt(s), "xC" refers to a constant current which is the product of x and a current in A which is numerically equal to the nominal capacity of the battery expressed in Ah, "rpm" means revolutions per minute, "NMR" means nuclear magnetic resonance spectroscopy, "GC/MS" means gas chromatography/mass spectrometry, "Ex" means Example and "Comp. Ex" means Comparative Example.

Materials and Methods
Cathode Preparation
Preparation of Primer on Aluminum Foil Current Collector—Using a Polyimide/Carbon Composite To prepare the polyamic acid, a prepolymer was first prepared. 20.6 wt % of PMDA:ODA prepolymer was prepared using a stoichiometry of 0.98:1 PMDA/ODA (pyromellitic dianhydride //ODA (4,4'-diaminodiphenyl ether) prepolymer). This was prepared by dissolving ODA in N-methylpyrrolidone (NMP) over the course of approximately 45 minutes at room temperature with gentle agitation. PMDA powder was slowly added (in small aliquots) to the mixture to control any temperature rise in the solution; the addition of the PMDA was performed over approximately two hours. The addition and agitation of the resulting solution under controlled temperature conditions. The final concentration of the polyamic acid was 20.6 wt % and the molar ratio of the anhydride to the amine component was approximately 0.98:1.

In a separate container, a 6 wt % solution of pyromellitic anhydride (PMDA) was prepared by combining 1.00 g of PMDA (Aldrich 412287, Allentown, Pa.) and 15.67 g of NMP (N-methylpyrrolidone). 4.0 grams of the PMDA solution was slowly added to the prepolymer and the viscosity was increased to approximately 90,000 poise (as measured by a Brookfield viscometer—#6 spindle). This resulted in a finished prepolymer solution in which the calculated final PMDA:ODA ratio was 1.01:1.

5.196 grams of the finished prepolymer was then diluted with 15.09 grams of NMP to create a 5 wt % solution. In a vial, 16.2342 grams of the diluted finished prepolymer solution was added to 0.1838 grams of TimCal Super C-65 carbon black. This was further diluted with 9.561 grams of NMP for a final solids content of 3.4 wt %, with a 2.72 prepolymer:carbon ratio. A Paasche VL#3 Airbrush sprayer (Paasche Airbrush Company, Chicago, Ill.) was used to spray this material onto the aluminum foil (25 µm thick, 1145-0, Allfoils, Brooklyn Heights, Ohio). The foil was weighed prior to spraying to identify the necessary coating to reach a desired density of 0.06 mg/cm$^2$. The foil was then smoothed onto a glass plate, and sprayed by hand with the airbrush until coated. The foil was then dried at 125° C. on a hot plate, and measured to ensure that the desired density was reached. The foil was found to be coated with 0.06 mg/cm$^2$ of the polyamic acid. Once the foil was dried and at the desired coating, the foil was imidized at 400° C. following the imidization procedure below:

40° C. to 125° C. (ramp at 4° C./min)
125° C. to 125° C. (soak 30 min)
125° C. to 250° C. (ramp at 4° C./min)
250° C. to 250° C. (soak 30 min)
250° C. to 400° C. (ramp at 5° C./min)
400° C. to 400° C. (soak 20 min)

Coating of the Cathode Electroactive Layer onto the Primed Al Foil
Preparation of the Paste The binder used was a Solef® 5130 (Solvay, Houston, Tex.) binder that was diluted to a 5.5% solution in NMP (N-methylpyrrolidone, Sigma Aldrich, St. Louis, Mo.). The following materials were used to make an electrode paste: 6.0352 g Farasis 1,1,1 NMC (Ni, Mn, Co, Farasis Energy, Hayward, Calif.) cathode active powder; 0.3342 g carbon black (Denka uncompressed, DENKA Corp., Japan); 6.0971 g PVDF (polyvinylidene difluoride (Solef® 5130) diluted with 2.1491 g NMP (portion 1)+0.3858 g NMP (portion 2)

(Sigma Aldrich). The materials were combined in a ratio of 90:5:5, cathode active powder:PVDF:carbon black, as described below. The final paste contained 44.7 wt % solids.

The carbon black, the first portion of NMP, and the PVDF solution were first combined in a plastic THINKy container and centrifugally mixed (ARE-310, Thinky USA, Inc., Laguna Hills, Calif.) for 2 minutes at 2000 rpm. The cathode active powder and the $2^{nd}$ portion of NMP were added and the paste was centrifugally mixed once again at 2000 rpm for 2 minutes. An ultrasonic horn was immersed into the paste and ultrasonic energy was applied for approximately three seconds.

The aluminum foil (25 μm thick, 1145-0, Allfoils, Brooklyn Heights, Ohio) was pretreated with a polyimide/carbon primer as described above.

Coating and Calendering the Cathode Electrode

The paste was manually cast using doctor blades with a 5 mil gate height plus 2 mil of Kapton® tape to produce a total gate opening of 7 mils onto the primed aluminum foil. The electrodes were dried for 60 minutes at 90° C. in a vacuum oven. The resulting 51-mm wide cathodes were placed between 125 mm thick brass sheets and passed through a calendar three times using 100 mm diameter steel rolls at 125° C. with pressure increasing in each pass, at pressures of 18 psi, 24 psi, and 30 psi. The calendar was set to have a nip force (in lb)=37.8× regulator pressure (psi). Loadings of cathode active material were approximately 7.57-8.0 mg/cm$^2$.

Anode Preparation

The following is a typical procedure used for the preparation of the anodes used in the Examples herein. An anode paste was prepared from the following materials: 5.00 g graphite (CPreme® G5, Conoco-Philips, Huston, Tex.); 0.2743 g carbon black (Super C65, Timcal, Westlake, Ohio); 3.06 g PVDF (13% in NMP. KFL #9130, Kureha America Corp.); 11.00 g 1-methyl-2-pyrrolidinone (NMP); and 0.0097 g oxalic acid. The materials were combined in a ratio of 88:0.17:7:4.83, graphite:oxalic acid:PVDF:carbon black, as described below. The final paste contained 29.4% solids.

Oxalic acid, carbon black, NMP, and PVDF solution were combined in a plastic vial. The materials were mixed for 60 s at 2000 rpm using a planetary centrifugal mixer. The mixing was repeated a second time. The graphite was then added. The resulting paste was centrifugally mixed two times. The vial was mounted in an ice bath and homogenized twice using a rotor-stator for 15 min each time at 6500 rpm and then twice more for 15 min at 9500 rpm. The point where the stator shaft entered the vial was wrapped with aluminum foil to minimize water vapor ingress to the vial. Between each of the four homogenization periods, the homogenizer was moved to another position in the paste vial. The paste was then centrifugally mixed three times.

The paste was cast using a doctor blade with a 230 μm gate height on to copper foil (CF-LBX-10, Fukuda, Kyoto, Japan) using the automatic coater. The electrodes were dried for 30 min at 95° C. in the mechanical convection oven. The resulting 51-mm wide anodes were placed between 125 μm thick brass sheets and passed through a calender three times using 100 mm diameter steel rolls at ambient temperature with nip forces increasing in each of the passes, starting at 260 kg with the final pass at 770 kg.

The loading of the anode active component was approximately 4.2-4.4 mg/cm$^2$.

Coin Cell Fabrication

Circular anodes 14.3 mm diameter and cathodes 12.7 mm diameter were punched out from the electrode sheets described above, placed in a heater in the antechamber of a glove box (Vacuum Atmospheres, Hawthorne, Calif., with HE-493 purifier), further dried under vacuum overnight at 90° C., and brought into an argon-filled glove box. Non-aqueous electrolyte lithium-ion CR2032 coin cells were prepared for electrochemical evaluation. The coin cell parts (case, spacers, wave spring, gasket, and lid) and coin cell crimper were obtained from Hohsen Corp (Osaka, Japan). The separator was a Celgard 2500 (Celgard/Polypore International, Charlotte, N.C.).

Coin Cell Evaluations at 25° C.

The coin cells were cycled twice for formation using a commercial battery tester (Series 4000, Maccor, Tulsa, Okla.) at ambient temperature using constant current charging and discharging between voltage limits of 3.0-4.6 V at a current of 17.5 mA per gram of cathode active material, which is approximately a 0.1 C rate. Following this procedure, the coin cells were cycled using constant current charging and discharging between voltage limits of 3.0-4.6 V at a current of 87.5 mA per gram of cathode active material, which is approximately a C/2 rate. During each charge step, the voltage was subsequently held at 4.6 V until the current tapered to C/20 (approximately 8.75 mA per gram of active cathode material).

Electrolyte Synthesis

Representative Preparation of 2,2-Difluoroethyl Acetate

The 2,2-difluoroethyl acetate used in the following Examples was prepared by reacting potassium acetate with $HCF_2CH_2Br$. The following is a typical procedure used for the preparation.

Potassium acetate (Aldrich, Milwaukee, Wis., 99%) was dried at 100° C. under a vacuum of 0.5-1 mm of Hg (66.7-133 Pa) for 4 to 5 h. The dried material had a water content of less than 5 ppm, as determined by Karl Fischer titration. In a dry box, 212 g (2.16 mol, 8 mol % excess) of the dried potassium acetate was placed into a 1.0-L, 3 neck round bottom flask containing a heavy magnetic stir bar. The flask was removed from the dry box, transferred into a fume hood, and equipped with a thermocouple well, a dry-ice condenser, and an additional funnel.

Sulfolane (500 mL, Aldrich, 99%, 600 ppm of water as determined by Karl Fischer titration) was melted and added to the 3 neck round bottom flask as a liquid under a flow of nitrogen. Agitation was started and the temperature of the reaction medium was brought to about 100° C. $HCF_2CH_2Br$ (290 g, 2 mol, E.I. du Pont de Nemours and Co., 99%) was placed in the addition funnel and was slowly added to the reaction medium. The addition was mildly exothermic and the temperature of the reaction medium rose to 120-130° C. in 15-20 min after the start of the addition. The addition of $HCF_2CH_2Br$ was kept at a rate which maintained the internal temperature at 125-135° C. The addition took about 2-3 h. The reaction medium was agitated at 120-130° C. for an additional 6 h (typically the conversion of bromide at this point was about 90-95%). Then, the reaction medium was cooled down to room temperature and was agitated overnight. Next morning, heating was resumed for another 8 h.

At this point the starting bromide was not detectable by NMR and the crude reaction medium contained 0.2-0.5% of 1,1-difluoroethanol. The dry-ice condenser on the reaction flask was replaced by a hose adapter with a Teflon® valve and the flask was connected to a mechanical vacuum pump through a cold trap (−78° C., dry-ice/acetone). The reaction product was transferred into the cold trap at 40-50° C. under a vacuum of 1-2 mm Hg (133 to 266 Pa). The transfer took about 4-5 h and resulted in 220-240 g of crude $HCF_2CH_2OC(O)CH_3$ of about 98-98.5% purity, which was contaminated by a small amount of $HCF_2CH_2Br$ (about 0.1-0.2%), $HCF_2CH_2OH$ (0.2-0.8%), sulfolane (about 0.3-0.5%) and water (600-800 ppm). Further purification of the crude product was carried out using spinning band distillation at atmospheric pressure. The fraction having a boiling point between 106.5-106.7° C. was collected and the impurity profile was monitored using GC/MS (capillary column HP5MS, phenyl-methyl siloxane, Agilent19091S-433, 30.m, 250 μm, 0.25 μm, carrier gas —He, flow rate 1 mL/min; temperature program: 40° C., 4 min, temp. ramp 30° C./min, 230° C., 20 min). Typically, the distillation of 240 g of crude product gave about 120 g of $HCF_2CH_2OC(O)CH_3$ of 99.89% purity, (250-300 ppm $H_2O$) and 80 g of material of 99.91% purity (containing about 280 ppm of water). Water was removed from the distilled product by treatment with 3A molecular sieves, until water was not detectable by Karl Fischer titration (i.e., <1 ppm).

Example 1

DFEA/EC+2 wt % Ethylene Sulfate, 2 wt % LiBOB, 2 wt % FEC

In a nitrogen purged dry box, LiBOB [lithium bis(oxalato) borate, Sigma-Aldrich, Milwaukee, Wis.] was purified by the following procedure. 11.25 g of LiBOB was added to a 400 mL beaker with 50 mL anhydrous acetonitrile. The mixture was stirred and heated to 40° C. for about 30 minutes. The warm mixture was filtered through a Whatman #1 filter and transferred into a second beaker and allow to cool to room temperature. A clear solution was obtained. To this clear solution, about 50 mL of cold anhydrous toluene (−30° C.) was added. This was stirred for an additional 30 minutes to form a precipitate. The solution was filtered through a Whatman #1 filter and the filter cake was washed again with the cold anhydrous toluene. After allowing the filter cake to dry on the vacuum filtration funnel, the solids were removed from the dry box and placed in a vacuum oven at 130° C. and dried with a slight nitrogen purge for 15 hours to form the final product, which was subsequently handled in the nitrogen purged drybox.

The electrolyte was prepared by combining 70 weight % of DFEA (2,2-difluoroethyl acetate) and 30 wt % EC (ethylene carbonate, BASF, Independence, Ohio) in a nitrogen purged drybox. Molecular sieves (3A) were added and the mixture was dried to less than 1 ppm water. After filtration with a 0.25 micron PTFE syringe filter, $LiPF_6$ (lithium hexafluorophosphate (BASF, Independence, Ohio) was added to make the formulated electrolyte at 1 M concentration.

2.8209 g of this mixture was combined with 0.0601 g of purified LiBOB, 0.06002 g of fluoroethylene carbonate (FEC) (BASF, Independence, Ohio), and 0.06001 g of ethylene sulfate (ES) (Aldrich, Milwaukee, Wis.).

Example 2

DFEA/EC+2 wt % Ethylene Sulfate, 2 wt % LiBOB

The same procedure as described in Example 1 were used, with the following differences.
Preparation of the Paste
The binder used was a Solef® 5130 (Solvay, Houston, Tex.) binder that was diluted to a 5.5% solution in NMP. The following materials were used to make an electrode paste: 6.0352 g Farasis 1,1,1 NMC (Ni, Mn, Co, Farasis Energy, Hayward, Calif.) cathode active powder; 0.3342 g carbon black (Denka uncompressed, DENKA Corp., Japan); 6.0971 g PVDF (polyvinylidene difluoride (Solef® 5130) diluted with and 2.1491 g NMP (portion 1) and 0.3858 g NMP (portion 2). The materials were combined in a ratio of 90:5:5, cathode active powder:PVDF:carbon black, as described below. The final paste contained 44.7 wt % solids.

The electrolyte was prepared by combining 70 weight % of 2,2-difluoroethyl acetate (DFEA) and 30 wt % ethylene carbonate (EC, BASF, Independence, Ohio) in a nitrogen purged drybox. Molecular sieves (3A) were added and the mixture was dried to less than 1 ppm water. After filtration with a 0.25 micron PTFE syringe filter, $LiPF_6$ (lithium hexafluorophosphate, BASF, Independence, Ohio) was added to make the formulated electrolyte at 1 M concentration. 1.9202 g of this mixture was combined with 0.0407 g of purified LiBOB (described above), and 0.0404 g of ethylene sulfate (ES).

Example 3

28 wt % DFEA, 28 wt % DFEMC, 30 wt % EC, 16 wt % DMC, +1 M $LiPF_6$+2 wt % Ethylene Sulfate+2% LiBOB The same procedure as described in Example 2 were used, with the following differences.

Synthesis of 2,2-Difluoroethyl Methyl Carbonate (DFEMC)

A solution of 2,2-difluoroethanol (125 g; 1.52 mol; mw=82.05; D=1.30; bp=95° C.; Synquest 2101 Mar. 2) and pyridine (139 g; 1.76 mol; mw=79.1; D=0.98; Aldrich 270970) in 1 L anhydrous dichloromethane was placed under nitrogen in a 3-neck, 3-L RB flask with overhead stirring and dropping funnel attached. The solution was cooled by stirring in an ice bath. Methyl chloroformate (166 g; 1.76 mol; mw=94.50; D=1.22; bp=70° C., Aldrich M35304) was placed in the dropping funnel and was added to the stirred solution of difluoroethanol and pyridine over 30 min. When about 100 mL of methyl chloroformate had been added, pyridine HCl suddenly precipitated and the mixture became a white slurry. The mixture was stirred for 30 min. The ice bath was removed and the mixture stirred at RT for 65 hr.

The reaction mixture was filtered to remove pyridine hydrochloride and the white solids were rinsed once with 100 mL dichloromethane. The filtrate was washed first with 150 mL 1N aqueous HCl, then 60 mL 10% HCl, and finally 40 mL 10% HCl. The filtrate was washed with 80 mL 5% sodium carbonate and the organic layer was separated and dried over anhydrous $MgSO_4$ for 3 hr.

After suction-filtration, the filtrate was distilled under nitrogen from a 130° C. oil bath through a 50-cm PTFE spinning band still to remove 750 mL dichloromethane. The oil bath temperature was then raised to 165° C. and the product was distilled. The input voltage to the column heater band was set at 20V on a Variac potentiostat.

Distillation fractions were analyzed by GC (30-m DB-5; 30° C./5 min, then 10° C./min; He: 14.8 cc/min). Retention times: 0.92 min (2,2-difluoroethanol; DFE); 1.06 (dichloromethane; DCM); 1.87 min (dimethyl carbonate; DMC; this is a byproduct in the methyl chloroformate); 4.75 min (2,2-difluoroethyl methyl carbonate, DFEMC); 4.95 min (methyl isobutyl ketone; MIBK; this is an impurity in DFE).

Spinning Band Distillation A

| Fraction | Reflux Ratio | BP(° C.) | Bath Temp, ° C. | Wt, g | GC Analysis (%) |
|---|---|---|---|---|---|
| 1A | 9 | 38.3-130.0 | 160 | 21 | 27.3 DCM; 17.7 DMC; 53.0 DFEMC |
| 2A | 7 | 130.0-133.3 | 165 | 16 | 0.15 DCM; 1.53 DMC; 98.25 DFEMC |
| 3A | 8 | 133.3 | 165 | 33 | 0.04 DCM; 0.09 DMC; 99.87 DFEMC |
| 4A | 7 | 133.3-133.5 | 166 | 35 | 0.01 DCM; 0.07 DMC; 99.93 DFEMC |
| 5A | 6 | 132.4-134.5 | 166 | 80 | 0.008 DCM; 99.98 DFEMC; 0.016 MIBK |

The distilled yield of 2,2-difluoroethyl methyl carbonate was 175 g (82%); GC: 0.04% DCM, 0.17% DMC, 99.79% DFEMC. Fractions 2A through 5A were combined (164 g) and redistilled with the column heater band set at 17V.

Spinning Band Distillation B

| Fraction | Reflux Ratio | BP(° C.) | Bath Temp,° C. | Wt, g | GC Analysis (%) |
|---|---|---|---|---|---|
| 1B | 7 | 109-130.0 | 167 | 3.4 | 6.46 DMC; 92.25 DFEMC |
| 2B | 6 | 130.0-133.0 | 167 | 69 | 0.022 DCM; 0.023 DMC; 99.96 DFEMC |
| 3B | 6 | 133.0-133.3 | 167 | 58 | 99.99 DFEMC |
| 4B | 6 | 133.3 | 167 | 28 | 100.00 DFEMC |

Fraction 2B was redistilled, rejecting a forerun of 3.3 g (bp=128.3-132.9° C.). Then the product (63.7 g) was collected (bp=133.0-133.7° C.); GC: 0.01% DCM; 99.98% DFEMC. This distillate was combined with fractions 3B and 4B to give 149 g of GC: 99.97% DFEMC. This was spinning band-distilled once more in 3 fractions and was analyzed again by GC: Fraction 1 (82 g): 99.97; Fraction 2 (38 g): 99.98%; Fraction 3 (21 g): 99.97%. These fractions were recombined (140 g) and were used to formulate electrolytes.

The electrolyte formulation of Example 3 was prepared by combining 9.7361 grams of EC, 4.5459 grams of DMC (dimethyl carbonate, BASF, Independence, Ohio), 9.0845 g of DFEA and 9.1006 grams of DFEMC. The mixture was dried over 3A molecular sieves. The mixture was filtered using a 0.2 micron PTFE syringe filter and 4.002 grams of LiPF6 (BASF, Independence, Ohio) was then added. 1.9217 g of the mixture described above was combined with 0.0406 g of purified LiBOB (described above) and 0.0402 g of ethylene sulfate (ES) to prepare the formulated electrolyte.

Comparative Example A

DFEA/EC+2% LiBOB+2% FEC

The same procedure as described in Example 1 were used, with the following differences.
Preparation of the Paste
The binder used was a Solef® 5130 (Solvay, Houston, Tex.) binder that was diluted to a 5.5% solution in NMP (N-methylpyrrolidone, Sigma Aldrich, St. Louis, Mo.). The following materials were used to make an electrode paste: 6.1552 g Farasis 1,1,1 NMC (Ni, Mn, Co, Farasis Energy, Hayward, Calif.) cathode active powder; 0.3420 g carbon black (Denka uncompressed, DENKA Corp., Japan); 6.2174 g PVDF (polyvinylidene difluoride (Solef® 5130) diluted with and 1.8588 g NMP (portion 1) and 0.5171 g NMP (portion 2) (Sigma Aldrich). The materials were combined in a ratio of 90:5:5, cathode active powder:PVDF:carbon black, as described below. The final paste contained 45.32 wt % solids.

The electrolyte was prepared by combining 70 weight % of 2,2-difluoroethyl acetate and 30 wt % EC in a nitrogen purged drybox. Molecular sieves (3A) were added and the mixture was dried to less than 1 ppm water. After filtration with a 0.25 micron PTFE syringe filter, $LiPF_6$ was added to make the formulated electrolyte at 1 M concentration. 1.925 g of this mixture was combined with 0.0400 g of purified LiBOB, purified as described above, and 0.0410 g of FEC (fluoroethylene carbonate, BASF, Independence, Ohio).

Comparative Example B

DFEA/EC+2% Ethylene Sulfate

The same procedure as described for Example 1 was followed, except for the following difference. The electrolyte was prepared by combining 70 weight % of 2,2-difluoroethyl acetate and 30 wt % EC in a nitrogen purged drybox. Molecular sieves (3A) were added and the mixture was dried to less than 1 ppm water. After filtration with a 0.25 micron PTFE syringe filter, $LiPF_6$ was added to make the formulated electrolyte at 1 M concentration. 2.9401 g of this mixture was combined with 0.06001 g of ethylene sulfate.

Comparative Example C

DFEA/EC+10% Ethylene Sulfate

The same procedure as described for Example 1 was followed, except for the following difference.

The electrolyte was prepared by combining 70 weight % of DFEA and 30 wt % EC in a nitrogen purged drybox. Molecular sieves (3A) were added and the mixture was dried to less than 1 ppm water. After filtration with a 0.25 micron PTFE syringe filter, $LiPF_6$ was added to make the formulated electrolyte at 1 M concentration. 2.7004 g of this mixture was combined with 0.30031 g of ethylene sulfate to prepare the formulated electrolyte.

TABLE 1

Results for Coin Cell Evaluations of Electrolytes of Comparative Examples A, B, and C, and for Example 1, 2, and 3.

| Example | Electrolyte * | Cycle Life 80% |
|---|---|---|
| Comp. Ex. A (cell 1) | DFEA/EC + 2% FEC + 2% LiBOB | 220 |
| Comp. Ex. A (cell 2) | DFEA/EC + 2% FEC + 2% LiBOB | 199 |
| Comp. Ex. B (cell 1) | DFEA/EC + 2% ES | 62 |
| Comp. Ex. B (cell 2) | DFEA/EC + 2% ES | 72 |
| Comp. Ex. B (cell 3) | DFEA/EC + 2% ES | 86 |
| Comp. Ex. C (cell 1) | DFEA/EC + 10 wt % ES | 34 |
| Comp. Ex. C (cell 2) | DFEA/EC + 10 wt % ES | 57 |
| Comp. Ex. C (cell 3) | DFEA/EC + 10 wt % ES | 34 |
| Ex. 1 (cell 1) | DFEA/EC + 2 wt % ES, 2 wt % LiBOB, 2 wt % FEC | 375 |
| Ex. 1 (cell 2) | DFEA/EC + 2 wt % ES, 2 wt % LiBOB, 2 wt % FEC | 359 |

TABLE 1-continued

Results for Coin Cell Evaluations of Electrolytes of Comparative Examples A, B, and C, and for Example 1, 2, and 3.

| Example | Electrolyte * | Cycle Life 80% |
|---|---|---|
| Ex. 1 (cell 3) | DFEA/EC + 2 wt % ES, 2 wt % LiBOB, 2 wt % FEC | 665 |
| Ex. 2 (cell 1) | DFEA/EC + 2 wt % ES + 2 wt % LiBOB | 369 |
| Ex. 2 (cell 2) | DFEA/EC + 2 wt % ES + 2 wt % LiBOB | 497 |
| Ex. 2 (cell 3) | DFEA/EC + 2 wt % ES + 2 wt % LiBOB | 212 |
| Ex. 3 | DFEA/DFEMC/EC/DMC + 2 wt % ES + 2 wt % LiBOB | 332 |

* All electrolytes also contained 1M $LiPF_6$

The results in Table 1 show that the cells containing the electrolytes of Examples 1, 2, and 3 retained 80% of their initial discharge capacity through a higher number of cycles than did the cells of the Comparative Examples. Cell 3 of Example 2, which had the lowest Cycle Life 80% of the Examples, had a Cycle Life 80% which was roughly comparable to that of Comparative Example 1 and substantially better than that of Comparative Examples B and C.

Examples 4 and 5

Comparative Examples D and E

Preparation of High Voltage Layered-Spinel (HVLS) Electroactive Cathode Material 397.2 g of $MnO_2$ (Alfa Aesar 42250), 101.2 g NiO (Alfa Aesar 12359) 11.9 g $Fe_2O_3$ (Aldrich 310030) and 117.7 g of $Li_2CO_3$ (Alfa Aesar 13418) were added to a UHMWPE vibratory milling pot, along with 5 kg of 10 mm cylinder yttria-stabilized zirconia media and 625 g of acetone. The pot was sealed and low amplitude vibratory milled on a Sweco mill for 40.5 hours. Then 50 g of LiCl (Alfa Aesar 36217) was added to the pot and it was milled for an additional 3 hours. The mixed powder was separated from the acetone by vacuum filtration through a nylon membrane and dried. The dry cake was then placed in a poly bag and tapped with a rubber mallet to break up or pulverize any large agglomerates. The resulting powder was packed into a 750 mL alumina tray, covered with an alumina plate and fired in a box furnace with the following heating protocol: 25° C. to 900° C. in 6 hours; dwell at 900° C. for 6 hours; cool to 100° C. in 15 hours.

Once the fired material was at room temperature, it was again placed in a poly bag and tapped with a rubber mallet. Then it was transferred to a 1 gallon (3.78 L) poly jug and slurried with 1 L of deionized water. The jug was placed in an ultrasonic bath for 15 minutes to aid dissolution of LiCl. Following this procedure, material was filtered using a 3 L fine glass frit Buchner funnel, and rinsed with 21 L of deionized water to remove any residual lithium chloride. The filter cake was rinsed with 150 mL of isopropyl alcohol to remove the water, and partially dried. The filter cake was transferred to a 1 gallon (3.78 L) poly bottle with 500 g of isopropanol (IPA), and 2 kg of 10 mm yittria-stabilized zirconia cylinder media for particle size reduction. The bottle was tumbled for 90 minutes on a set of rollers, then filtered through the same glass Buchner funnel to remove the IPA. Finally the powder was dried in a vacuum oven overnight at 70° C. The $0.03Li_2MnO_3 \cdot 0.97LiMn_{1.5}Ni_{0.45}Fe_{0.05}O_4$ HVLS composite thus prepared was used as the cathode active material in making the cathodes below.

Silicate-Primed Aluminum Current Collector:

The following were combined in an Erlenmeyer flask:

| | |
|---|---|
| 1.0 g | carbon black (C65, Timcal) |
| 13.6 g | Li polysilicate solution, 20% by weight in water (Sigma Aldrich) |
| 0.023 | Triton X-100 detergent |
| 75 g | water |

The suspension was stirred with a magnetic stirrer at 500 rpm for 30 min, followed by rotor/stator disperser for 5 min at 10,000 rpm. The suspension was sprayed on to aluminum current collector foils (25 µm thick, 1145-0, Allfoils, Brooklyn Heights, Ohio) and dried under ambient to give a deposit of about 0.07 mg/cm².

Electrode Preparation:

Cathode paste was made from:

| | |
|---|---|
| 0.52 g | carbon black (Super C65, Timcal, Westlake, OH) |
| 10.4 g | solution of 5% pVDF (Solef 5130, Solvay, West Deptford, NJ) in NMP (N-methylpyrrolidone (Sigma-Aldrich, Milwaukee, WI)) |
| 3.0 g | NMP |
| 9.36 g | HVLS |

The carbon black, PVDF solution, and NMP were first combined in a plastic jar and centrifugally mixed (ARE-310, Thinky USA, Inc., Laguna Hills, Calif.) two times for 60 s at 2000 rpm each time. The cathode active powder was added and the paste was centrifugally mixed two times (2×1 min at 2000 rpm). The paste was further mixed using a rotor-stator homogenizer (model PT 10-35 GT, 9 mm diameter rotor, Kinematicia, Bohemia, N.Y.). The paste was homogenized for 5 min at 9500 rpm. During this time the vial was moved to bring the various portions of the paste into contact with the homogenizer rotor blade. Bubbles were removed using the centrifugal mixer. The paste was cast using a doctor blade (102 mm wide×0.20 mm gate height, Bird Film Applicator Inc., Norfolk, Va.) onto the silicate-primed aluminum current collector using an electric-drive coater (Automatic Drawdown Machine II, Paul N. Gardner Co., Pompano Beach, Fla.). The electrodes were dried for 30 min in a mechanical convection oven (model FDL-115, Binder Inc., Great River, N.Y.). The temperature in the oven was increased from 80° C. to 100° C. during the first 15 min, and held at 100° C. for the second 15 minutes. After drying the composition of the cathode was 90:5:5 wt:wt:wt HVLS: pVDF:black. The cathode was placed between brass cover sheets and calendered between 100 mm dia steel rolls at 125° C. to give 40 µm thick cathodes with porosity of approximately 37% and loading of 9 mg HVLS/cm².

Anodes were graphite:pVDF:carbon black (88:7:5 wt:wt: wt) coated on a copper foil current collector. The graphite was G5 (CPreme® G5, Conoco-Philips, Huston, Tex.); the carbon black was C65. The anode coating weight was 5 mg graphite/cm² and the anodes were calendered to a thickness of 37 µm and porosity of about 28%.

Electrolytes:

Examples 4-9 amd Comparative Examples 4-19 used a $LiPF_6$/EC/DFEA base electrolyte (1 M $LiPF_6$ in a solvent mixture of 30 wt % EC, 70 solvent wt % DFEA) with specified weight percentages of additives as indicated in Table 2. 1,3-propane sultone (PS), succinic anhydride (SA), and and maleic anhydride (MA) were obtained from Sigma-Aldrich Co., St. Louis, Mo., and were purified by sublimation. Ethylene sulfate (ES, 1,3,2-dioxathiolane, 2,2-dioxide) was obtained from Sigma-Aldrich. Vinylene carbonate (VC, Sigma-Aldrich Co.) had its BHT inhibitor removed by passing the VC through a short column of alumina.

Pouch Cells:

Cathodes were punched out to 31.3 mm×45 mm size and anodes were punched out to 32.4 mm×46.0 mm. Al and Ni tabs were ultrasonically welded to the current collectors, and single-layer pouch cells were assembled using a foil-polymer laminate pouch material (C4-480ST, Showa Denko Packaging Corp, Osaka, Japan). The tabs were sealed into the top of the pouch outside the dry box, leaving the two sides and bottom open. The pouch was dried in the antechamber of a dry box under vacuum overnight at 90° C. Inside the argon-filled dry box, a microporous polyolefin separator (Celgard 2500, Charlotte, N.C.) was placed between the anode and cathode, and the sides sealed. The electrolyte (350 μl) was injected through the bottom, and the bottom edge sealed in a vacuum sealer. The cells were mounted in fixtures which applied 0.32 MPa pressure via a foam pad to the active area of the pouch.

Cell Evaluation:

Using a battery tester (Series 4000, Maccor, Tulsa, Okla.), the cells were subjected to two formation cycles between voltage limits of 3.4-4.9 V at 25° C. and using constant currents (CC) of 12 mA per g of cathode active material. The first cycle coulombic efficiency (CE) was calcualted as the ratio of the capacity of the first discharge to the capacity of the first charge. The cells were then cycled twice at 3.4-4.9 V using CC charges at 40 mA/g plus a current taper at constant voltage (CV) to 2.4 mA/g, and CC discharges of 40 mA/g without CV. Cell capacities were calculated from the second CC discharge of 40 mA/g without CV. The cells were then cycled five times with both charges and discharges at 240 mA/g.

Following the five cycles at room temperature, the pulse power characteristics of the cells were measured as follows. The cells were fully discharged at room temperature by discharging to 3.4 V at C/3 followed by a CV hold until the current reached 0.02 C. Based on the cell capacities calculated above, the cells were charged at 25° C. to 60% state of charge (SOC) at C/3 and then held at open circuit for 10 min to stabilize the voltage. The response of the cells to short discharge pulses was measured for sequential discharge currents of C/3, C/1, 3 C, and 5 C, as described below.

The measurement at C/3 was carried out by subjecting the cell to a 10 s pulse at C/3 discharge current. At the end of the pulse, the cell was left at open circuit for 10 min. The discharge pulse resulted in a small reduction in the state of charge of the cell. In order to return the cell to 60% SOC, the cell was then recharged for 10 s at C/3. The cell was then held at open circuit for 10 min. The measurement at C/1 was carried out next by applying a discharge current of 1 C for 10 s. This was followed by 10 min at open circuit, recharging the cell back to 60% SOC by charging at C/3 for 30 s, and a 10 min hold at open circuit. The measurement at 3 C was carried out next by applying a discharge current of 3 C for 10 s. This was followed by 10 min at open circuit, recharging the cell back to 60% SOC at C/3 for 90 s, and a 10 min hold at open circuit. The final pulse power measurement at 5 C was carried out by discharging the cell at 5 C for 10 s. This was followed by 10 min at open circuit, recharging the cell back to 60% SOC at C/3 for 150 s and a 10 min hold at open circuit.

The pulse power performance is characterized by the resistance, or impedance, of the cell to a DC current pulse. This impedance, which has units of ohms ($\Omega$), is a measure of the ability of a cell to provide high power output and high cell efficiency for short discharge and charge pulses. Low impedance is preferred. In order to compare results between laboratories, the impedance is normalized for the area of the cell by multiplying it by the geometric areas of the limiting electrode in the cell to yield the area specific impedance (ASI), with units of $\Omega \cdot cm^2$.

The measured ASI is a function of the cell design, the properties of the materials used in the cell, and the characteristics (time and current) of the DC pulse. By changing the electrolyte while keeping the other components of the cell constant and using identical current pulses, the technique provides information on the performance characteristics of the electrolyte.

The ASI was calculated for each of the power pulses at C/3, C/1, 3 C and 5 C as follows. The voltage drop during the 10 s pulse $\Delta V$ was measured by subtracting the voltage measured at the end of the DC current pulse (while the discharge current was still being applied) from the voltage immediately prior to the application of the DC current pulse (while the cell was still at open circuit). The ASI was then calculated from the formula:

$$\text{ASI}(\text{ohm} \cdot cm^2) = \Delta V(\text{volt}) \times A(cm^2)/I \qquad (A)$$

where I is the current during the discharge pulse and A is the geometric area of the limiting electrodes, which was the cathode for the pouch cells on which this measurements were carried out. For the combination of materials used in the measurements reported here, the ASI was weakly dependent on the discharge current. Values for the ASI measured at 5 C and 25° C. are reported in Table 2.

Finally, the cells were placed in an oven at 55° C. and cycled using constant current charging and discharging between voltage limits of 3.4-4.9 V at a current of 240 mA per gram of cathode active material, which was approximately a 2 C rate. The cycle life recorded in Table 2 is the number of cycles required to reduce the discharge capacity to 80% of the discharge capacity observed in the second cycle.

TABLE 2

Results for Examples 4 and 5, and Comparative Examples D and E

| Example | Electrolyte * | 1st Cycle CE (%) | 2nd Cycle Discharge Capacity (mAh/g) | ASI ohm cm² | Cycle Life 2 C 55° C. |
|---|---|---|---|---|---|
| Ex. 4 | DFEA/EC + 2% LiBOB + 2% ES | 81.1 | 118 | 17.3 | 264 |
| Ex. 5 | DFEA/EC + 2% LiBOB + 2% ES | 81.9 | 120 | 16.5 | 237 |
| Comp. Ex. D | DFEA/EC + 2% LiBOB + 2% PS | 76.5 | 117 | 21.5 | 152 |
| Comp. Ex. E | DFEA/EC + 2% LiBOB + 2% PS | 76.5 | 117 | 21.5 | 165 |

* All electrolytes also contained 1M LiPF$_6$

As the results in Table 2 show, Examples 4 and 5 using an electrolyte combining the non-fluorinated carbonate EC, the fluorinated solvent DFEA, LiBOB, and ethylene sulfate gave on average a 5% higher coulombic efficiency in the first formation cycle, 21% lower area-specific impedance in 10 s discharges at 5 C, and 58% higher cycle life at elevated temperature of 55° C. than did cells of Comparative Examples D and E which used electrolyte where the cyclic sulfate was replaced with 1,3-propane sultone.

Examples 6-9

Comparative Examples F-T

Electrode Preparation

Cathodes were prepared as for Examples 4 and 5 above, except the cathode active powder was NMC 532 (approx. $LiNi_{0.5}Mn_{0.3}Co_{0.2}O_2$, Jinhe Ningbo, China), the doctor blade gate height was increased to 0.29 mm, the resulting cathodes were calendered to a porosity of 33-35%, and the loading was about 13.9 mg $NMC/cm^2$. Anodes were similar to those used for Examples 4 and 5 above, except the loading was increased to about 8.7 mg graphite/$cm^2$ and the porosity was about 45%.

Pouch Cells

The pouch cell fabrication, electrolyte volume, fixtures, and tester were similar to that used in Examples 4 and 5, except both formation and cycling were at 25° C. In the following procedure, the currents for the C-rates were determined assuming the cells would have a capacity of 170 mAh per g of NMC. Thus currents of 0.05 C, 0.25 C, and 1.0 C were implemented in the tester using, respectively, currents of 8.5, 42.5, and 170 mA per gram of NMC in the cell.

The steps of the procedure following electrolyte injection and first sealing were:

1. Overnight wetting at open circuit (OC)
2. 1st charge
3. Aging at OC
4. Bring cell in dry box, open to release formation gas, vacuum reseal
5. Finish remainder of 1st charge
6. Discharge CC at 0.5 C to 3.0V
7. 2nd Cycle: Charge CC of 0.2 C to 4.35V+CV to 0.05 C: Discharge CC at 0.2 C to 3.0V.
8. $3^{rd}$ and subsequent Cycles used Charge CC 1 C to 4.35V+CV to 0.05 C, OCV rest 10 min, Discharge CC 1 C to 3.0V, OCV rest 10 min.

Table 3 below shows the $1^{st}$ cycle CE, discharge capacity in the second cycle, the number of cycles the cell was subjected to, the polarization resistance (Rp) measured in the last cycle, and the number of cycles required to reduce the discharge capacity to 80% of the maximum capacity obtained in the initial cycles starting at the $3^{rd}$ cycle. The polarization resistance Rp was calculated by taking the average cell voltage measured between 45% and 55% state of charge while the cell was charging at 1 C, subtracting the average cell voltage between 55% and 45% state of charge while the cell was discharging at 1 C, and dividing this difference by twice the current density (in $A/cm^2$) corresponding to 1 C. Rp is a measure of the resistance of the cell, and lower Rp values are desired. Lower Rp values are associated with increased round-trip energy efficiency (discharge energy/charge energy) of the cell.

TABLE 3

Results for Examples 6 Through 9 and Comparative Examples F Through T

| Example | Electrolyte* Additives and Loading | $1^{st}$ Cycle CE (%) | $2^{nd}$ Cycle Dischg. Cap. mAh/g | No. of Cycles Done 1 C 25° C. | Rp After Cycling ohm $cm^2$ | Cycle Life 1 C 25° C. |
|---|---|---|---|---|---|---|
| Ex. 6 | 0.5% LiBOB + 2% ES | 83.9 | 176 | 306 | 79 | 265 |
| Ex. 7 | 0.5% LiBOB + 2% ES | 83.9 | 176 | 308 | 75 | 258 |
| Ex. 8 | 0.5% LiBOB + 1% ES + 1% VC | 84.0 | 175 | 297 | 71 | 266 |
| Ex. 9 | 0.5% LiBOB + 1% ES + 1% VC | 83.8 | 175 | 380 | 79 | 318 |
| Comp. Ex. F | 0.5% LiBOB | 79.3 | 172 | 140 | 105 | 114 |
| Comp. Ex. G | 0.5% LiBOB | 79.3 | 171 | 141 | 113 | 109 |
| Comp. Ex. H | 2% ES | 83.7 | 176 | 278 | 86 | 287 |
| Comp. Ex. J | 2% ES | 83.8 | 177 | 276 | 88 | 250 |
| Comp. Ex. K | 0.5% LiBOB + 2% PS | 80.7 | 174 | 177 | 94 | 158 |
| Comp. Ex. L | 0.5% LiBOB + 2% PS | 81.0 | 173 | 180 | 92 | 159 |
| Comp. Ex. M | 2% LiBOB + 2% PS | 80.6 | 168 | 251 | 76 | 244 |
| Comp. Ex. N | 2% LiBOB + 2% PS | 80.5 | 168 | 251 | 73 | 239 |
| Comp. Ex. O | 2% LiBOB + 2% PS | 81.2 | 167 | 215 | 89 | 194 |
| Comp. Ex. P | 2% LiBOB + 2% PS | 81.7 | 170 | 221 | 81 | 216 |
| Comp. Ex. Q | 0.5% LiBOB + 2% SA | 82.1 | 168 | 151 | 94 | 94 |
| Comp. Ex. R | 0.5% LiBOB + 2% SA | 82.7 | 172 | 138 | 95 | 188 |

TABLE 3-continued

Results for Examples 6 Through 9
and Comparative Examples F Through T

| Example | Electrolyte* Additives and Loading | 1st Cycle CE (%) | 2nd Cycle Dischg. Cap. mAh/g | No. of Cycles Done 1 C 25° C. | Rp After Cycling ohm cm² | Cycle Life 1 C 25° C. |
|---|---|---|---|---|---|---|
| Comp. Ex. S | 0.5% LiBOB + 1% MA | 78.8 | 167 | 322 | 101 | 292 |
| Comp. Ex. T | 0.5% LiBOB + 1% MA | 77.9 | 164 | 121 | 113 | 111 |

*All electrolytes also contained 1M $LiPF_6$

Examples 6-7 and Comparative Examples F, G, H, and J together show that the combination of the borate salt LiBOB with the cyclic sulfate ethylene sulfate gives a superior combination of lower Rp and higher cycle life than do the additives used individually. Comparative Examples K through T show that the borate salt when combined with other additives such as 1,3-propane sultone, succinic anhydride, or maleic anhydride, also gives a poorer combination of Rp after cycling and cycle life.

What is claimed is:

1. An electrolyte composition comprising:
a) a non-fluorinated carbonate, wherein the non-fluorinated carbonate is one or more selected from a group consisting of ethylene carbonate, ethyl methyl carbonate, dimethyl carbonate, diethyl carbonate, and propylene carbonate;
b) 2,2-difluoroethyl acetate;
c) ethylene sulfate, present at a percent by weight of the composition in the range of about 0.1 wt % to about 12 wt %;
d) lithium bis(oxalato)borate at a percent by weight of the composition in the range of 0.1 wt % to 5 wt; and
e) at least one electrolyte salt, wherein the at least one electrolyte salt comprises lithium hexafluorophosphate.

2. The electrolyte composition of claim 1, further comprising a fluorinated cyclic carbonate.

3. The electrolyte composition of claim 2, wherein the fluorinated cyclic carbonate is fluoroethylene carbonate.

4. The electrolyte composition of claim 1, wherein the electrolyte composition comprises about 0.1 weight percent to about 12 weight percent of ethylene sulfate and about 0.1 weight percent to about 3 weight percent of lithium bis(oxalate)borate.

5. The electrolyte composition of claim 4, further comprising about 0.5 weight percent to about 3 weight percent of a fluorinated cyclic carbonate.

6. The electrolyte composition of claim 1, wherein the electrolyte composition comprises ethylene carbonate, 2,2-difluoroethyl acetate, ethylene sulfate, lithium bis(oxalato) borate, and further comprises fluoroethylene carbonate.

7. An electrochemical cell comprising:
(a) a housing;
(b) an anode and a cathode disposed in said housing and in ionically conductive contact with one another;
(c) the electrolyte composition of claim 1 disposed in said housing and providing an ionically conductive pathway between said anode and said cathode; and
(d) a porous separator between said anode and said cathode.

8. The electrochemical cell of claim 7, wherein said electrochemical cell is a lithium ion battery.

9. The lithium ion battery of claim 8, wherein the anode is lithium titanate or graphite.

10. The lithium ion battery of claim 8, wherein the cathode comprises a cathode active material exhibiting greater than 30 mAh/g, capacity in the potential range greater than 4.6 V versus a $Li/Li^+$ reference electrode.

11. The lithium ion battery of claim 8, wherein the cathode comprises a cathode active material which is charged to a potential greater than or equal to 4.35 V versus a $Li/Li^+$ reference electrode.

12. The lithium ion battery of claim 8, wherein the cathode comprises a lithium-containing manganese composite oxide having a spinel structure as active material, the lithium-containing manganese composite oxide being represented by the formula:

$Li_xNi_yM_zMn_{2-y-z}O_{4-d}$, wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18, and d is 0 to 0.3.

13. The lithium ion battery of claim 8, wherein the cathode comprises $Li_aA_{1-b}R_bD_2$, wherein: A is Ni, Co, Mn, or a combination thereof; R is Al, Ni, Co, Mn, Cr, Fe, Mg, Sr, V, Zr, Ti, a rare earth element, or a combination thereof; D is O, F, S, P, or a combination thereof; and $0.90 \leq a \leq 1.8$ and $0 \leq b \leq 0.5$.

14. The lithium ion battery of claim 8, wherein the cathode comprises a composite material represented by the structure of Formula:

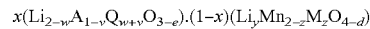

$x(Li_{2-w}A_{1-v}Q_{w+v}O_{3-e}) \cdot (1-x)(Li_yMn_{2-z}M_zO_{4-d})$ wherein:
x is about 0.005 to about 0.1;
A comprises one or more of Mn or Ti;
Q comprises one or more of Al, Ca, Co, Cr, Cu, Fe, Ga, Mg, Nb, Ni, Ti, V, Zn, Zr or Y;
e is 0 to about 0.3;
v is 0 to about 0.5;
w is 0 to about 0.6;
M comprises one or more of Al, Ca, Co, Cr, Cu, Fe, Ga, Li, Mg, Mn, Nb, Ni, Si, Ti, V, Zn, Zr or Y;
d is 0 to about 0.5;
y is about 0 to about 1; and
z is about 0.3 to about 1; and
wherein the $Li_yMn_{2-z}M_zO_{4-d}$ component has a spinel structure and the $Li_{2-w}O_{w+v}A_{1-v}O_{3-e}$ component has a layered structure.

15. The lithium ion battery of claim 8, wherein the cathode comprises $Li_aNi_bMn_cCo_dR_eO_{2-f}Z_f$, wherein: R is Al, Ni, Co, Mn, Cr, Fe, Mg, Sr, V, Zr, Ti, a rare earth element, or a combination thereof, and Z is F, S, P, or a combination thereof; and 0.8≤a≤1.2, 0.1≤b≤0.5, 0.2≤c≤0.7, 0.05≤d≤0.4, 0≤e≤0.2; wherein the sum of b+c+d e is about 1; and 0≤f≤0.08.

16. An electronic device, transportation device, or telecommunications device, comprising an electrochemical cell according to claim 7.

17. A method comprising combining:
a) a non-fluorinated carbonate, wherein the non-fluorinated carbonate is one or more selected from a group consisting of ethylene carbonate, ethyl methyl carbonate, dimethyl carbonate, diethyl carbonate, and propylene carbonate;
b) 2,2-difluoroethyl acetate;
c) ethylene sulfate present at a percent by weight of the composition in the range of about 0.1 wt % to about 12 wt %;
d) lithium bis(oxalato)borate at a percent by weight of the composition in the range of 0.1 wt % to 5 wt; and
e) at least one electrolyte salt, wherein the at least one electrolyte salt comprises lithium hexafluorophosphate;
to form an electrolyte composition.

* * * * *